United States Patent
Diehm

[11] Patent Number: 6,036,613
[45] Date of Patent: Mar. 14, 2000

[54] GUIDE RAIL FOR GUIDING AND/OR TENSIONING A CHAIN

[75] Inventor: Volker Diehm, Schaigern, Germany

[73] Assignee: Dr. Ing. h.c.F. Porsche AG, Germany

[21] Appl. No.: 09/017,624

[22] Filed: Feb. 2, 1998

[30] Foreign Application Priority Data

| Feb. 1, 1997 | [DE] | Germany | 197 03 788 |
| Apr. 10, 1997 | [DE] | Germany | 197 14 763 |

[51] Int. Cl.$^7$ .................. F16H 7/08; F16H 7/18
[52] U.S. Cl. .......................... 474/111; 474/140
[58] Field of Search ................... 474/101, 109, 474/110, 111, 140

[56] References Cited

U.S. PATENT DOCUMENTS

| 5,184,983 | 2/1993 | Chimaya et al. | 474/140 |
| 5,310,385 | 5/1994 | Suzuki | 474/110 |
| 5,318,482 | 6/1994 | Sato et al. | 474/111 |
| 5,427,582 | 6/1995 | Iwao et al. | 474/111 |
| 5,730,673 | 3/1998 | Schnupke et al. | 474/110 |
| 5,813,935 | 9/1998 | Dembosky et al. | 474/111 |
| 5,846,150 | 12/1998 | Wigsten | 474/140 |
| 5,868,638 | 2/1999 | Inoue et al. | 474/110 |
| 5,879,255 | 3/1999 | Yamamoto et al. | 474/110 |
| 5,908,363 | 6/1999 | Suzuki | 474/111 |

FOREIGN PATENT DOCUMENTS

| 3506010A1 | 8/1986 | Germany . |
| 3706136C1 | 9/1988 | Germany . |
| 195 07 0770 A1 | 9/1996 | Germany . |
| 195 07 770 A1 | 9/1996 | Germany . |
| 196 06 002 A1 | 9/1997 | Germany . |

OTHER PUBLICATIONS

Porsche Service Information—94, 911 Carrera, Illustration 649.
European Seach Report, Jul. 29,1999.

Primary Examiner—David A. Bucci
Assistant Examiner—Matthew A. Kaness
Attorney, Agent, or Firm—Evenson, McKeown, Edwards & Lenahan, P.L.L.C.

[57] ABSTRACT

A slide rail includes a slide lining body and a carrier which consist of a wear-resistant and mechanically highly stressable plastic material. The slide rail is held at one location by means of a bolt received by a bush on a housing and is provided with a supporting device at a second spaced location. The supporting device, which eliminates the need for a second bolt and a bush, is formed by a supporting section of the housing and a supported area of the slide rail. The supported area also consists of a wear-resistant plastic material.

26 Claims, 4 Drawing Sheets

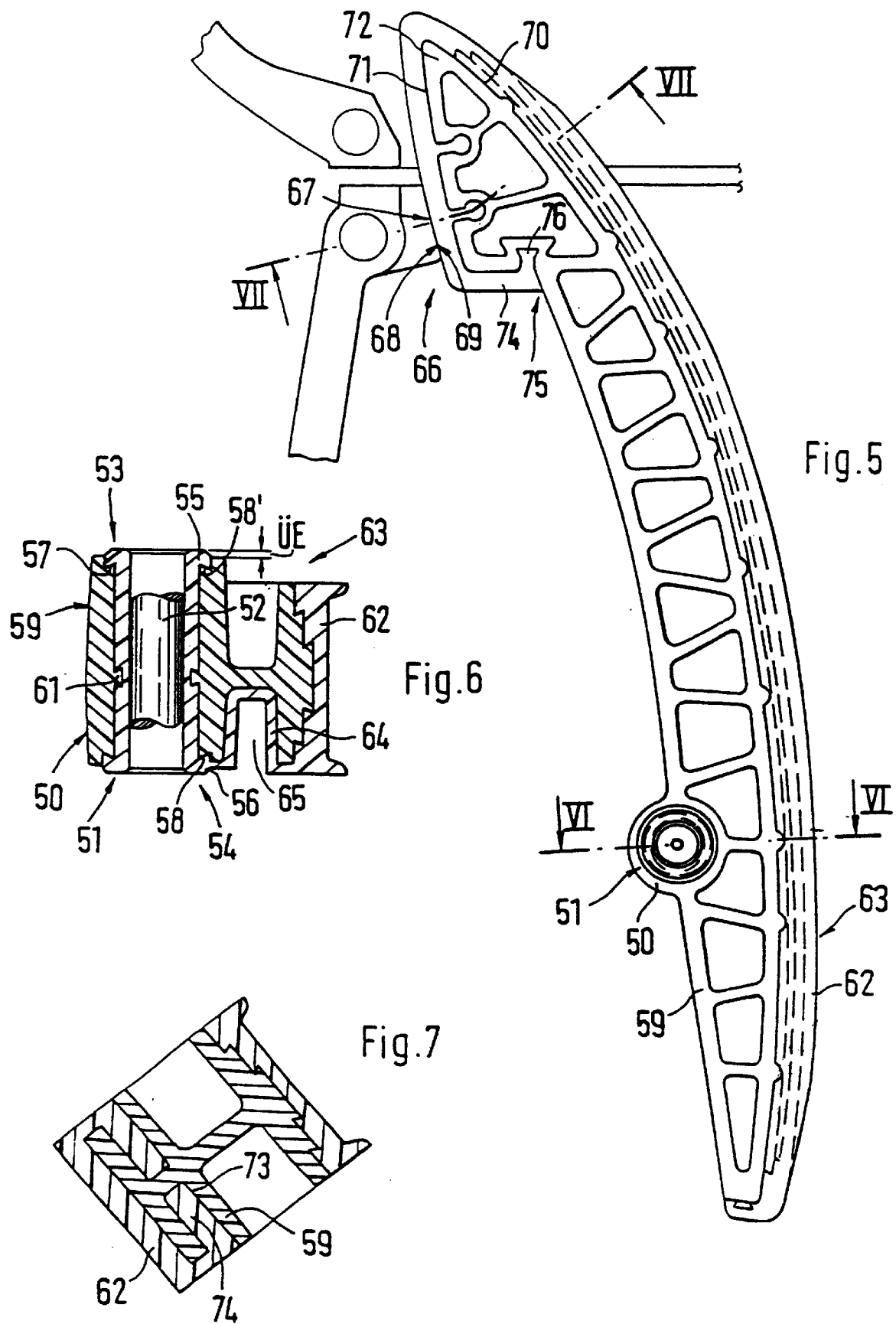

GUIDE RAIL FOR GUIDING AND/OR TENSIONING A CHAIN

BACKGROUND AND SUMMARY OF THE INVENTION

This application claims the priority of German application 197 03 788.7 filed Feb. 1, 1997 in Germany, and German application 197 14 763.1 filed Apr. 10, 1997 in Germany.

The invention relates to a slide rail for guiding and/or tensioning a chain, particularly for a camshaft drive of an internal-combustion engine, comprising a slide lining body and a carrier which each consist of a wear-resistant and mechanically highly stressable plastic material, the slide rail being held at a first position on the slide rail by means of a bolt received by a bush on a crankcase section of the internal-combustion engine and being provided with a supporting device at a second position on the slide rail spaced from the first position.

A known slide rail (German Patent Document DE-PS 37 06 136 corresponding to U.S. Pat. No. 4,832,669), which comprises a slide body and a carrier which are each made of plastic, has exhibited excellent results in practice in the case of the Porsche 911 Carrera Engine—*Porsche Service Information*—94, 911 Carrera, Illustration 649, specifically as a tensioning rail and also as a slide rail. In addition, while the stability is high under demanding load conditions, it was mainly found that the weight and the manufacturing costs are clearly lower than in the case of a conventional rail consisting of an aluminum carrier and a plastic rail lining body (German Patent Document DE-OS 35 06 010).

Based on the teaching of the above-mentioned practice-proven rail, it was suggested (German Patent Document DE 195 07 770 A1) to design the carrier and the rail lining body with a U-shaped cross-section on the side facing the chain. In this case, the slide lining body reaches behind the carrier on the legs of the U-shaped cross-section. This construction has the disadvantage that the U-shaped cross-section extends along a significant length of the rail which causes a high weight and also requires additional material. Furthermore, a slide rail with this selected cross-section required a relatively large amount of space which counteracts the endeavor to design the internal-combustion engine in a compact manner.

It is an object of the invention to further improve the technically proven slide rail, particularly with respect to its fastening on the internal-combustion engine.

According to the invention, this object is achieved by means of the characteristics of claim 1. Additional characteristics further developing the invention are contained in the following claims.

The principal advantages achieved by means of the invention are that, because of the supporting device consisting of the supporting section and the supported area, only a bolt and a bush are required for the teleologic (desired design position) holding of the slide rail. This further reduces the weight and the cost. An effective interaction between the supporting section and the supported area is achieved if the latter consists of a wear-resisting plastic material. The reason is that by this measure high loads are also securely absorbed over a long operating time, specifically by the material combination in which the supporting section is made of metal and the supported area is made of plastic. With respect to the manufacturing, the supporting section can be implemented in that it is manufactured of one piece with the slide lining body.

The line contact support ensures a defined function between the supporting section and the supported area and it can also be implemented by the concave design, preferably on the supported area.

The combination slide rail—slide lining body and support made of plastic—, single bolt, supporting device and projecting end of the slide rail permits a controlled chain travel in the case of which drive-caused movements of the chain based on the construction position can be effectively absorbed. This is also promoted by the local moment-of-resistance-increasing profiling.

The supported area is firmly connected with the slide body because the first web and the second web form a structural unit by means of ribs penetrating the carrier.

Transversely to the chain travel direction, the slide rail is fixed by a guiding device. In the bush of the carrier, a sleeve made of a wear-resistant plastic material is provided which represents a precision bore for the bolt constructed as a low-cost component.

Finally, the elastic damping device or spring device contributes to the fact that the slide rail is supported on the crankcase with little noise which is important in the case of internal-combustion engines with construction-type-specific operating characteristics, such as diesel engines.

Other objects, advantages and novel features of the present invention will become apparent from the following detailed description of the invention when considered in conjunction with the accompanying drawings.

BRIEF DESCRIPTION OF THE DRAWINGS

FIG. 5 is a view corresponding to FIG. 1, showing another embodiment of the invention;

FIG. 6 is a sectional view taken along Line VI—VI of FIG. 5;

FIG. 7 is a sectional view taken along Line VII—VII of FIG. 5;

DETAILED DESCRIPTION OF THE DRAWINGS

Figure 1:
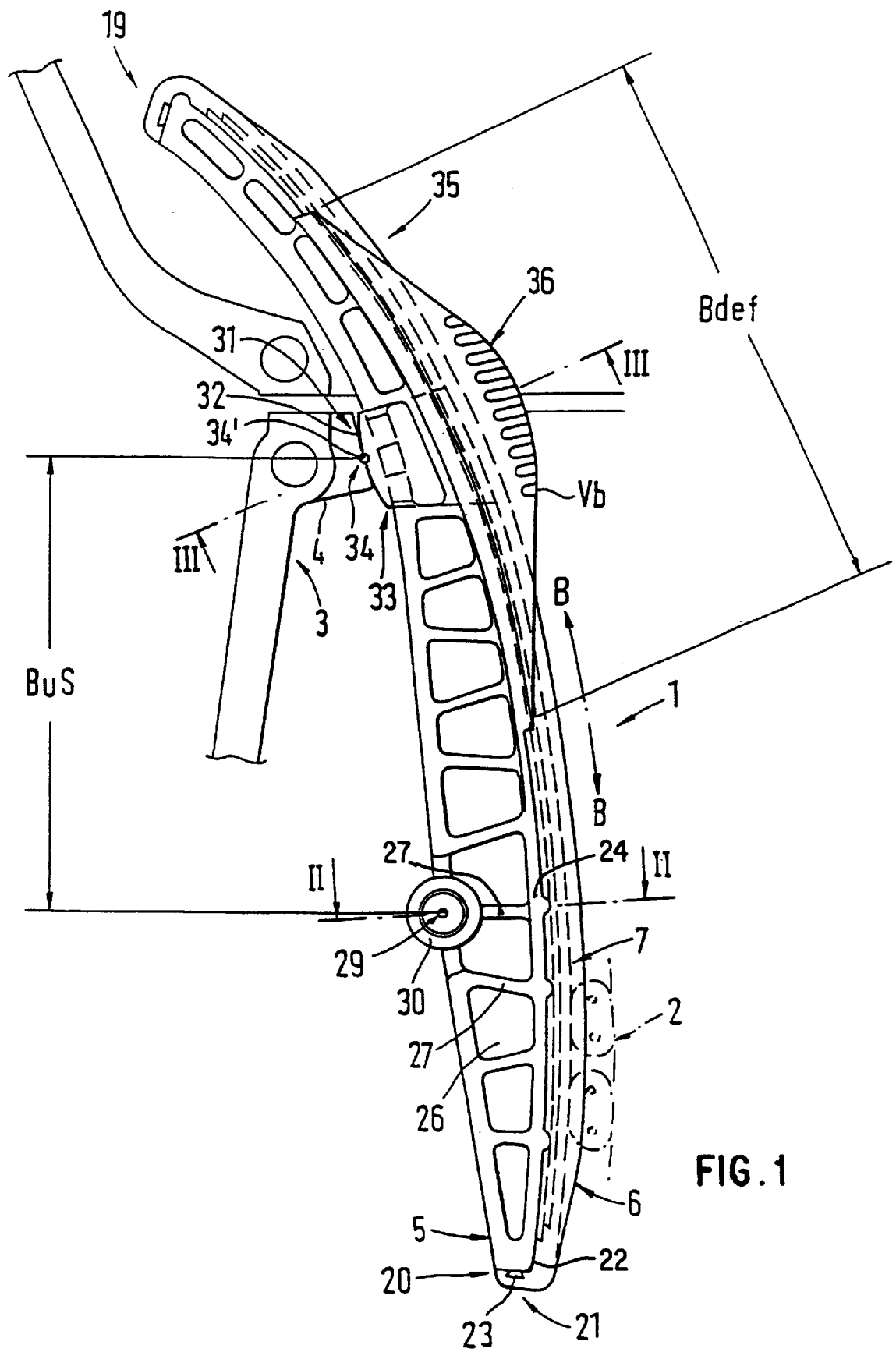
FIG. 1 is a lateral schematic view of a slide rail constructed according to a preferred embodiment of the present invention.

FIG. 1 illustrates a slide rail 1 which is used for guiding or for tensioning a chain 2. This relates, for example, to an endless link of a chain drive, which is a component of an internal-combustion engine 3, of which only a crankcase section 4 is shown. The chain drive operates between a crankshaft and a camshaft—"Porsche Service Information Technik" '94, 911 Carrera, Illustration 649, *Porsche Boxter Special Edition ATZ, Automobiletechnische Zeitschrift* and *MTZ, Motortechnische Zeitschrift*, December 1996, Pages 55, and *Sport Auto* 1/1997, Page 25.

The slide rail 1 is formed by a carrier 5 and a slide lining body 6 which comprises a sliding surface 7 for the chain 2. The carrier 5 and the slide lining body 7 consist of a plastic material of varying specifications, preferably of polyamide, in which case polyamide with fiber glass additions is used for the carrier 5 and wear-resistant polyamide without fiber glass additions is used for the slide lining body 6.

The sliding surface 7 is bounded by shoulders 8, 9 so that the slide lining body 6 has a U-shaped contour.

Figure 2:
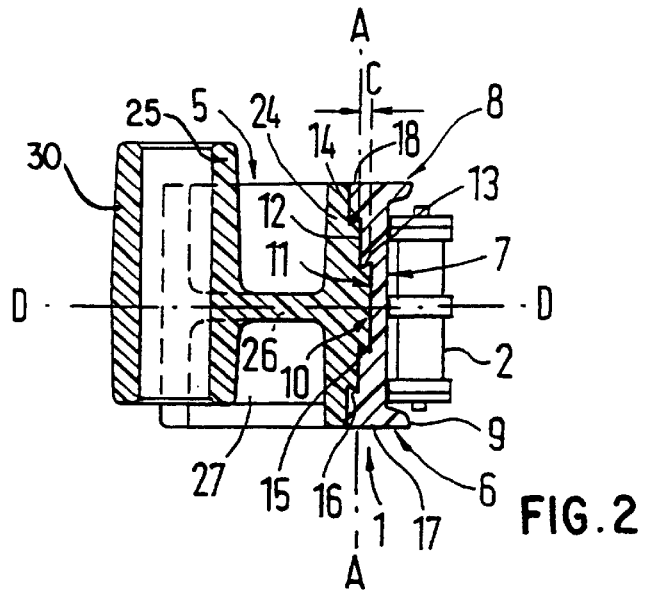
FIG. 2 is a sectional view taken along Line II—II in FIG. 1.

The carrier 5 and the slide lining body 6 are fitted together in a plane A—A. Between these components, which form a unit, projections 10, which mutually engage in one another and reach behind one another, are provided which, in the embodiment according to FIG. 2, are formed by two dovetail joints 11, 12. These dovetail joints 11, 12 extend along a chain travelling line B—B (FIG. 1).

In a cross-sectional view, the dovetail joints 11, 12 are arranged to be offset with respect to one another—distance C—and have profilings 13, 14 and 15, 16 which reach behind one another. The profilings 13, 15 of the dovetail joint 9 are arranged adjacent to a longitudinal center plane D—D of the slide rail 1. The profilings 14, 16 of the dovetail joint 12 are arranged adjacent to external zones 17, 18 of the slide rail 1.

The slide rail is produced as follows: First, the carrier 5 is manufactured by injection molding, specifically with the pertaining profilings of the dovetail joints 11, 12 (FIG. 2). Then the carrier 5 is used as a base body and the slide lining body 6 is combined with the above-mentioned carrier by injection molding. A different, stepped manufacturing process is also conceivable; specifically to first produce the slide lining body and then combine the carrier with it.

The carrier 5 has end sections 19, 20; the latter extending at reference number 21 approximately at a right angle to a carrier surface 22. The slide lining body 6 rests on the end section 20 and is held in position by means of a device 23—acting in a manner similar to that of a dovetail joint—which also acts between the carrier 5 and the slide lining body 6.

FIG. 2 illustrates that the carrier 5 has spaced cross flanges 24, 25 which are connected with one another by way of a web 26 which results in a double-T-shaped configuration. Laterally of the web 26, several spaced cross ribs 27 are provided which extend between the cross flanges 24, 25 and are aligned perpendicularly and/or at a sloped angle with respect to a chain travel line B—B.

For holding the slide rail 1 on the internal-combustion engine 3, a single bolt 29 is used which rests in a bush 30 of the carrier 5. At a distance from the bush 30, a supporting device 31 is provided between the crankcase section 4 and the slide rail 1 and is represented by a supporting section 32 on the crankcase section 4 and a supported area 33 on the slide rail 1. The supported area 33 is braced against the supporting section 32 while the chain 2 is tensioned; is mounted on the carrier 5 at a distance from the sliding surface 7 and consists of a wear-resistant plastic material (polyamide without fiber glass additions). Also, the supported area is manufactured of one piece with the slide lining body 6. Embodiments are also contemplated with the supported area fastened independently of the slide lining body 6 on the carrier 5.

At reference number 34, it is shown that the supporting section 32 and the supported area 33 interact by way of a type of line contact support 34'. The latter extends transversely to the slide rail 1 and becomes planar when loaded. In the embodiment shown, the supported area 33 is constructed to be convex or crowned for this purpose, whereas the supporting section 32 is a plane.

Figure 3:
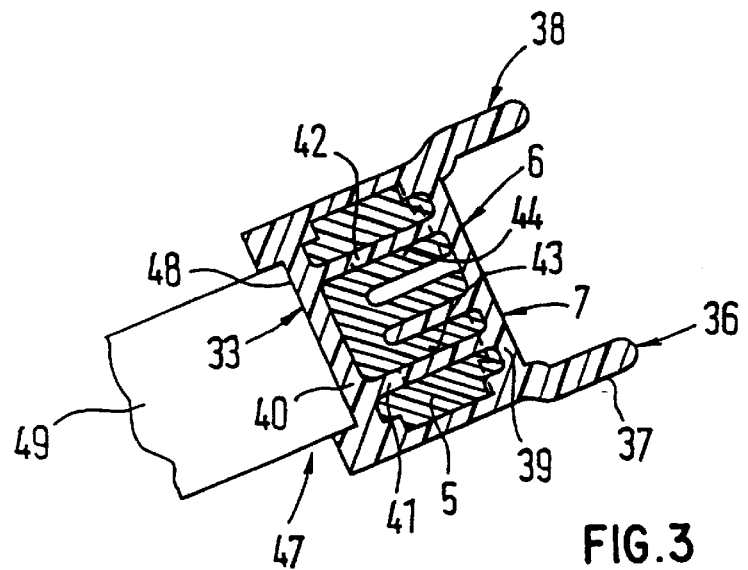
FIG. 3 is a sectional view taken along Line III—III of FIG. 1.

An end area 35 of the slide rail 1 situated away from the bolt 30 projects beyond the supporting device 31, in which case the slide rail 1 has a local profiling 36; for example, a U-shaped cross-section (FIG. 3) in the supported area 33. This profiling 36 increases the moment of resistance of the slide rail in this particularly stressed zone. In this case, the height of the legs 37, 38 of the profiling 35 is reduced along a defined area Bdef in the travelling direction of the chain 2 in a uniform manner such that the legs 36, 37 locally have a curved course (Vb). According to FIG. 3, a first web 39, which comprises the chain travel surface 7, and a second web 40 having the supported area 33 rest against the carrier 5, and the webs 39, 40, which extend in parallel to one another, are connected by way of ribs 41, 42 which penetrate ducts 43, 44 in the carrier 5. The legs 37, 38 are components of the slide lining body 6. Furthermore, the slide lining body 6 surrounds the carrier 5 on all sides.

Figure 4:
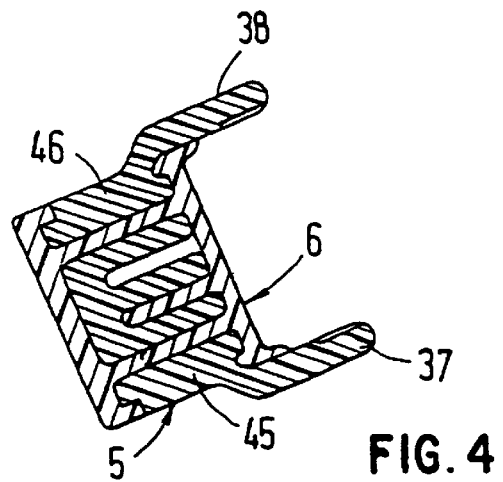
FIG. 4 is a view corresponding to FIG. 3 showing another embodiment of the invention.

In FIG. 4, the legs 37, 38 are manufactured of one piece with the carrier 5 and are constructed as extensions of lateral boundary cheeks 45, 46.

For fixing the position of the slide rail 1, a guiding device 47 is provided between the supporting section 32 and the supported area 33. It comprises a receiving device 48 and an engaging section 49, the receiving device 48 having a U-shaped cross-section.

FIG. 5 illustrates that a cylindrical sleeve 51 made of a wear-resistant plastic material—polyamide without fiber glass additions—is inserted into a bush 50. The sleeve 51, which comprises a precision bore for a bolt 52, is provided at its ends 53, 54 with collar-type expansions 55, 56 which reach behind receiving devices 57, 58 in a carrier 59 of a slide rail 60. The expansions 55, 56, which project laterally beyond the carrier 59 (extent ÜE), and the receiving devices 57, 58 interact by way of undercuts. The projecting area of the expansions 55, 56 can be utilized as a contact on the housing of the internal-combustion engine in order to cause an additional lateral support of the slide rail 1. In addition, at reference number 60, dovetail joints 61 are provided in the radial direction between the sleeve 51 and the carrier 59.

The sleeve 51 is manufactured of one piece with a slide lining body 62 which, together with the carrier 59, forms the slide rail 63. A wall 64, which extends outside the carrier 59 but rests against it, extends between the sleeve 51 and the slide lining body 62. The wall 64 follows a recess 65 of the carrier 59.

At reference number 66, a supporting device 67 is illustrated which extends at a distance from the bolt 52 or the bush 50. The supporting device 67 comprises a supporting section 68 and a supported area 69. The supported area 69 is part of the slide lining body 62 which is pulled around an upper wall 70 and a lower wall 71 of an acute-angle end area 72 of the carrier 59. The lower wall 71 forms the supported area 69 and is manufactured of one piece with the slide lining body 62.

FIG. 7 illustrates a possible connection of the supported area 69 with the carrier 59. Accordingly, recesses 73 are provided locally in the carrier 59 into which corresponding pins or projections 74 of the slide lining body 62 engage.

Finally, starting from the lower wall 71, the slide lining body 62 is again provided with a bend 74, its end 75 being fixed by means of a dovetail joint 76.

Figure 8:
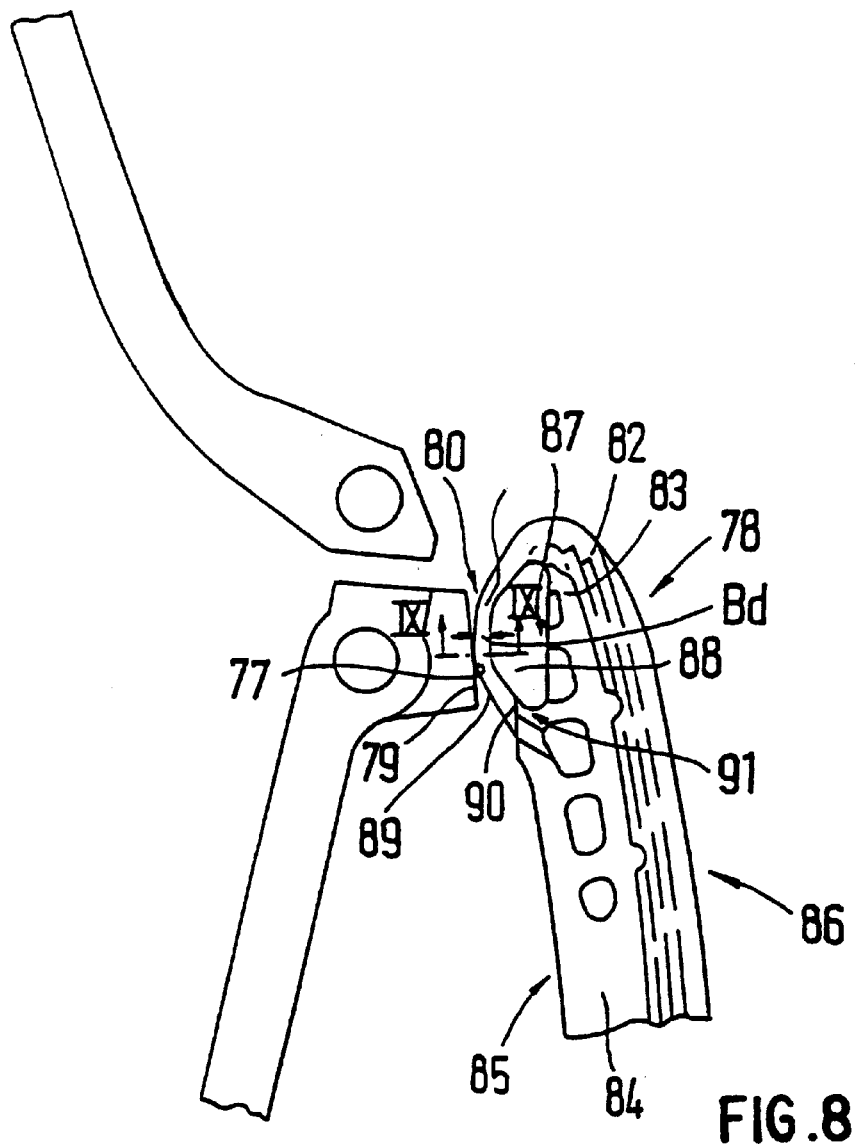
FIG. 8 is a partial view of a portion similar to FIG. 1 showing another embodiment of the invention.

According to FIG. 8, the supported area 77 of the slide rail 78, which rests on the supporting section 79, is constructed as an elastic damping device or as a spring device 80. For this purpose, the supported area 77 is represented as a leaf spring 81 whose leaf thickness Bd is, for example, determined iteratively. Viewed from the slide rail 78, the leaf spring 81 has a convex design in order to achieve a line contact effect (compare supporting section 32 and supported area 33).

The leaf spring 81 is manufactured of one piece with the slide lining body 82 which is pulled around an end area 83 of the carrier 84 such that it extends along both longitudinal sides 85, 86 of the carrier 84. In this case, the leaf spring 81 forms an extension of the slide lining body 82.

Figure 9:
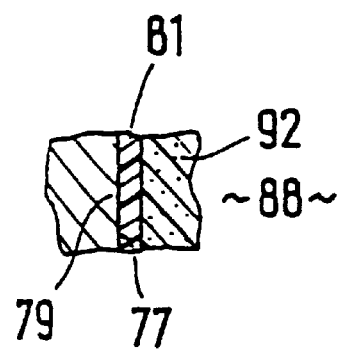
FIG. 9 is a sectional view taken along Line IX—IX of FIG. 8.

In addition, the leaf spring 81, together with a recess-type carrier section 87 of the carrier 84, is constructed such that a lug 89 which bounds the hollow space 88 is created whose end 90 is supported on the carrier 84 at reference number 91. An insert 92—FIG. 9—consisting of a resilient material, such as rubber, elastomers or the like, is inserted into the hollow space 88.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A slide rail assembly for guiding a camshaft drive chain of an internal combustion engine, said slide rail assembly comprising:
    a carrier,
    a slide lining body carried by the carrier and including a slide surface engageable in use with a camshaft drive chain, said slide lining body being formed of a wear resistant plastic material,
    a bolt accommodating bush formed in said carrier for accommodating a bolt for attaching the slide rail assembly at a first position to an engine, and
    a support section of the slide rail assembly which in use is abuttingly supported at the engine at a second position spaced from the first position, said support section being formed of a wear resistant plastic material.

2. Slide rail assembly according to claim 1, wherein the support section is manufactured in one piece with the slide lining body.

3. Slide rail according to claim 1, wherein the support section in use engages an engine structure by way of a line contact support.

4. Slide rail assembly according to claim 3, wherein the line contact support is formed by a convex design.

5. Slide rail assembly according to claim 4, wherein the convex design is provided at least on the support section.

6. Slide rail assembly according to claim 1, wherein a free end area of the slide rail assembly projects beyond the support section in a direction facing away from the bolt.

7. Slide rail according to claim 1, wherein a local profiling of a U-shaped cross-section is provided adjacent the support section for increasing rigidity and strength of the slide rail assembly in the area of the support section.

8. Slide rail assembly according to claim 7, wherein legs of the U-shaped cross-section decrease uniformly in height on both sides of the support section as viewed in a chain traveling direction of a chain supported on the slide lining body when in an in use operating position.

9. Slide rail assembly according to claim 1, wherein the slide lining body includes a first web forming a chain traveling surface and a second web forming the support section, said first said second webs resting on the carrier and being connected with one another by way of at least one rib penetrating the carrier.

10. Slide rail assembly according to claim 1, wherein the slide lining body surrounds the carrier on all sides in the support section area.

11. Slide rail assembly according to claim 1, comprising a guiding device between the support section and the engine when in an in use position.

12. Slide rail assembly according to claim 11, wherein the guiding device has a receiving device and an engaging section.

13. Slide rail assembly according to claim 12, wherein the receiving device has a U-shaped cross-section.

14. Slide rail assembly according to claim 1, wherein a cylindrical sleeve made of a wear-resistant plastic material is provided in the bush.

15. Slide rail assembly according to claim 14, wherein the sleeve comprises collar expansions on its ends, which extend behind receiving devices in the carrier.

16. Slide rail assembly according to claim 15, wherein the expansions and the receiving devices interact by way of undercuts.

17. Slide rail assembly according to claim 14, wherein the sleeve and the slide lining body are manufactured of one piece.

18. Slide rail assembly according to claim 17, wherein a wall of the slide lining body in contact outside the carrier extends between the slide lining body and the sleeve.

19. Slide rail assembly according to claim 1, wherein the slide lining body is extended around an upper wall and a lower wall of the carrier on an end area to form a bend, which lower wall forms the support section.

20. Slide rail assembly according to claim 19, wherein the slide lining body from the direction of the lower wall is again provided with a bend.

21. A slide rail assembly according to claim 1, wherein the support section is constructed as an elastic damping device.

22. Slide rail according to claim 21, wherein the elastic damping device of the support section is a type of leaf spring.

23. Slide rail assembly according to claim 22, wherein the leaf spring has a convex construction at least in parts thereof.

24. Slide rail assembler according to claim 22, wherein the slide lining body is guided around an end area of the carrier, and
    wherein the leaf spring is made in one piece with the slide lining body.

25. Slide rail assembly according to claim 24, wherein the leaf spring, together with a carrier section, forms a lug bounding a hollow space, an end of said lug being supported on the carrier.

26. Slide rail assembly according to claim 25, wherein the hollow space is constructed with an insert made of a resilient material, such as rubber, elastomers.

* * * * *